United States Patent [19]

Stanforth

[11] Patent Number: 5,037,479

[45] Date of Patent: * Aug. 6, 1991

[54] METHOD FOR REDUCTION OF HEAVY METAL LEACHING FROM HAZARDOUS WASTE UNDER ACIDIC AND NONACIDIC CONDITIONS

[75] Inventor: Robert R. Stanforth, Madison, Wis.

[73] Assignee: RMT, Inc., Madison, Wis.

[*] Notice: The portion of the term of this patent subsequent to Dec. 26, 2006 has been disclaimed.

[21] Appl. No.: 512,641

[22] Filed: Apr. 20, 1990

[51] Int. Cl.$^5$ .................................................. B09B 3/00
[52] U.S. Cl. ........................................ 106/691; 75/746; 405/129; 423/92; 423/102; 423/659; 423/DIG. 20; 588/257
[58] Field of Search ................ 405/129; 423/35, 55, 423/305, 659, DIG. 20, 792, 92, 102; 75/722, 586, 746; 106/735, 691; 588/257; 210/751

[56] References Cited

U.S. PATENT DOCUMENTS

| | | | |
|---|---|---|---|
| 4,356,030 | 10/1982 | Halpin | 75/586 |
| 4,652,381 | 3/1987 | Inglis | 423/35 |
| 4,671,882 | 6/1987 | Douglas | 423/305 |
| 4,764,284 | 8/1988 | Jansen | 423/35 |
| 4,878,944 | 11/1989 | Rolle et al. | 75/25 |
| 4,889,640 | 12/1989 | Stanforth | 210/751 |
| 4,950,409 | 8/1990 | Stanforth | 405/129 |

OTHER PUBLICATIONS

1985, AFS Transactions, "Methods to Treat EP Toxic Foundry Wastes and Waste Waters," vol. 93, pp. 737-740.

California Cast Metals Association, Feb. 1989, "Detoxifying Foundry Sand," Report to Members.

Nagle, D. L., R. R. Stanforth, P. E. Duranceau and T. P. Kunes, 1983, AFS Transactions, "Treatment of Hazardous Foundry Melting Furnace Dust and Sludges," vol. 91, pp. 715-720.

Turpin, P. D., T. R. Stalzenburg, W. A. Stephens, and T. P. Kunes.

*Primary Examiner*—Gary P. Straub
*Assistant Examiner*—C. Robert Chen
*Attorney, Agent, or Firm*—Lathrop & Clark

[57] ABSTRACT

A method of treating solid hazardous wastes containing unacceptable levels of leachable metals such as lead, cadmium and zinc includes mixing the solid waste with a buffering agent selected from the group consisting of magnesium oxide, magnesium hydroxide, reactive calcium carbonates and reactive magnesium carbonates, and with an additional agent which is an acid or salt containing an anion that forms substantially nonleachable forms of the metals, which additional agent is selected from the group consisting of triple superphosphate, ammonium phosphate, diammonium phosphate, phosphoric acid, boric acid and metallic iron so that under both acidic and nonacidic leaching conditions the metals in the mixture will be converted to substantially nonleachable forms.

18 Claims, No Drawings

METHOD FOR REDUCTION OF HEAVY METAL LEACHING FROM HAZARDOUS WASTE UNDER ACIDIC AND NONACIDIC CONDITIONS

FIELD OF THE INVENTION

This invention pertains generally to the field of treating solid hazardous waste, and particularly to the chemical treatment of solid waste containing unacceptable levels of leachable metals, such as lead, cadmium and zinc to control leaching under both acidic and nonacidic reaction conditions.

BACKGROUND OF THE INVENTION

Safe disposal of hazardous waste is an increasing societal problem. Once a hazardous waste is generated, disposal and treatment of the waste is heavily regulated by the United States Environmental Protection Agency because of the potentially serious consequences of improper disposal or treatment.

Foundries typically generate large quantities of solid waste which is collected as baghouse dust. These wastes often contain leachable heavy metals, such as lead, cadmium and zinc. If the levels of leachable heavy metals are high, the wastes are classified as hazardous wastes by U.S. EPA or the state regulatory agencies.

Disposal of hazardous wastes containing high levels of leachable heavy metals, such as lead or cadmium, is expensive. In addition to the business cost of completing paperwork associated with the regulation of hazardous waste, tipping fees are usually more than $150 per ton. Transportation costs are also high since hazardous waste must often be transported some distance for disposal in approved facilities. These costs will undoubtedly increase with the U.S. EPA prohibition on land disposal of untreated hazardous waste beginning on May 8, 1990. Therefore, a method of treating hazardous waste to render it nonhazardous could result in tremendous cost savings for generators of hazardous waste, such as foundries.

Solid wastes are classified as hazardous by U.S. EPA for a number of reasons. Certain wastes are classified as hazardous because they contain chemicals which are listed by U.S. EPA as hazardous. Other wastes are classified as hazardous because of characteristics of the waste. These characteristics include ignitability, corrosivity, reactivity, and Extraction Procedure (EP) Toxicity.

Extraction Procedure Toxicity is determined using the Extraction Procedure Toxicity Test (EP Toxicity Test) contained in 40 C.F.R. Part 261, Appendix II, (1989), the disclosure of which is hereby incorporated by reference. In the near future, the Toxicity Characteristic Leaching Procedure (TCLP) will replace the EP Toxicity Test. The EP Toxicity Test and TCLP determine whether a solid waste has unacceptable levels of hazardous substances, such as heavy metals, which can be leached from the waste by infiltrating water. Wastes containing leachable lead and cadmium are currently classified as EP Toxic Waste if the level of cadmium extracted in an EP Toxicity test is above 1.0 mg/L or if the level of lead extracted is above 5.0 mg/L. The upcoming ban on disposal of untreated hazardous waste will require that wastes that are hazardous for lead and/or cadmium leaching not be land disposed without treatment. Some states, notably Michigan, also classify wastes which leach high levels of zinc as hazardous.

The EP Toxicity Test and TCLP are designed to simulate a worst-case leaching situation. These leaching conditions would typically be found in the interior of an actively degrading municipal landfill. In such landfills, the leaching medium is slightly acidic, with a pH of about 5. Additionally, the leaching medium is heavily buffered by volatile organic acids (e.g., acetic acid) produced by the facultative anaerobic degradation of organic matter.

In fact, many industrial wastes are not disposed of under acidic conditions. The actual leaching conditions experienced by these wastes in an industrial landfill may be quite different from the worst-case situation simulated by the EP Toxicity and TCLP tests. In general, high volume hazardous waste, such as foundry baghouse dust, is disposed of in a situation where it is not exposed to a heavily buffered acidic leachate, but rather to unbuffered waters such as rain.

Tests are available which simulate the more typical disposal situation for hazardous wastes such as foundry waste. These tests utilize a relatively unbuffered solution, e.g., deionized water, to provide a better simulation of leaching as it actually occurs in the environment. Examples of nonacidic or not heavily buffered acidic leach tests, commonly referred to as water leach tests, include the Indiana Water Leach Test, which is also called the EP Water Test (Indiana Administrative Code Title 329, Article 2, Solid Waste Management Rule 9); the U.S. EPA Multiple Extraction Procedure (U.S. EPA, 1986, *Test Methods for Evaluating Solid Waste*, Volume 1C, Method 1320); the American Society of Testing Materials Test (ATSM Standards, method D3987-85); the American Foundrymans Society Leach Test (Ham, R. K., W. C. Boyle and T. P. Kunes, *J. Env. Eng. Div. Amer. Soc. Civil Eng.*, 107 EEL, pp. 155-170, 1981); and the University of Wisconsin SLT Test (Ham, R. K., M. A. Anderson, R. Stegmann and R. R. Stanforth, EPA 600/2-79/109, 1979).

For wastes that are not disposed of in acidic environments, two separate leach tests need to be run to determine whether the waste is hazardous according to regulatory standards, and to determine whether the waste could pose an actual environmental risk when exposed to nonacidic leachate in a disposal facility. The EP Toxicity Test or TCLP test will define the regulatory status of the waste. A water leach test will provide an indication of the actual leaching potential of the waste in the environment.

It is important to utilize both types of tests because lead and zinc are amphoteric metals. Therefore, at alkaline pH values, lead will solubilize and may leach from waste at concentrations that exceed the drinking water standards (maximum contaminant levels) established under the Safe Drinking Water Act. Lead levels may even exceed the hazardous waste standards at alkaline pH values. Because zinc is also an amphoteric metal, it would be expected that zinc could also leach from waste at alkaline PH values, at levels of environmental concern. It should be noted that cadmium is not an amphoteric metal except at extremely high pH and leaching of cadmium from treated waste under nonacidic leaching conditions has not been observed.

These considerations are important because one method that has been used for treating hazardous wastes containing leachable metals is the addition of alkaline materials to control the pH of the EP Toxicity test so that the metals will not be extracted at levels above the hazardous waste standards when the waste is analyzed using the EP Toxicity Test or TCLP test. A number of alkaline additives have been used which chemically react with metals in the waste and control the leaching test pH. (See, for example, Hickock, E. A., and Associates. 1984, "Foundry Waste Stabilization: Laboratory Testing and Conceptual Equipment Design", Report to Participating Foundry Groups, 47 pages; California Cast Metals Association, 1989, "Detoxifying Foundry Sand", Report to Members; Nagle, D.L., R. R. Stanforth, P. E. Duranceau and T. P. Kunes, 1983, AFS Transactions, Vol. 91, pp. 715-720; Turpin, P. D., T. R. Stolzenburg, W. A. Stephens, and T. P. Kunes, 1985, AFS Transactions, Vol. 93, pp. 737-740; and U.S. Pat. No. 4,889,640 issued Dec. 26, 1989 to Stanforth).

Hazardous wastes containing leachable metals that are treated with alkaline additives currently meet regulatory standards for land disposal. However, the tests used for regulatory purposes, the EP Toxicity Test and TCLP, do not necessarily simulate actual environmental conditions. Consequently, it is possible to treat a waste with chemical additives to reduce leaching of metals such as lead and cadmium in the EP Toxicity Test and TCLP to render it nonhazardous from a regulatory standpoint, while at the same time increasing the pH to the point where lead is solubilized when a water leach test is run. For wastes containing zinc, it would also be expected that zinc could leach at levels of environmental concern. Since the water leach test simulates common disposal conditions in the environment, this indicates that it is possible to create an environmental problem in the process of solving a regulatory problem.

The data in Table 1 show the problem with present treatment methods which reduce leaching of lead and cadmium when a treated waste is analyzed using an acidic leach test such as the EP Toxicity Test or TCLP, but simultaneously increase leaching of lead when treated waste is analyzed using a water leach test. Note that some of the additives, particularly cement, are commonly thought to chemically bind up heavy metals (U.S. EPA (1989), "Stabilization of CERCLA and RCRA Wastes", publication EPA 1625/6-89/022, Cincinnati, Ohio). As shown in Table 1, the binding was not sufficient to immobilize the metals at alkaline pH values.

TABLE 1

TREATMENT OF EP TOXIC WASTES WITH ALKALINE ADDITIVES: EP TOXICITY AND WATER LEACH TEST RESULTS

| Sample | EP Toxicity Test | | | EP Water Test | | |
|---|---|---|---|---|---|---|
| | Final pH | Cd mg/L | Pb mg/L | Final pH | Cd mg/L | Pb mg/L |
| 1. Untreated | 5.6 | 8.8 | 79 | Not Tested | | |
| Treated with Cement | | | | | | |
| +20% | 7.2 | 3.0 | 12 | 11.5 | <0.005 | 12 |
| +30% | 9.4 | <0.005 | 0.3 | 11.9 | <0.005 | 26 |
| 2. Untreated | 5.0 | 9.8 | 85.1 | 9.8 | 0.0034 | 0.022 |
| Treated with Magnesium Oxide | | | | | | |
| +7.5% | 9.7 | 0.029 | 0.3 | 10.8 | 0.0003 | 1.3 |
| 3. Untreated | 5.1 | 9.2 | 9.7 | 6.5 | 6.8 | 3.4 |
| Treated with Calcium Oxide | | | | | | |
| +4% | 6.9 | — | 11.0 | 11.9 | — | 16.0 |
| +6% | 8.9 | 0.23 | 0.3 | 12.1 | <0.01 | 5.5 |
| +8% | 9.7 | 0.04 | 0.4 | 12.4 | <0.01 | 8.8 |
| +10% | 10.0 | 0.02 | 0.3 | 12.4 | <0.01 | 8.6 |
| +12% | 11.0 | 0.01 | 2.4 | 12.5 | <0.01 | 8.6 |

TABLE 1-continued

TREATMENT OF EP TOXIC WASTES WITH ALKALINE ADDITIVES: EP TOXICITY AND WATER LEACH TEST RESULTS

| Sample | EP Toxicity Test | | | EP Water Test | | |
|---|---|---|---|---|---|---|
| | Final pH | Cd mg/L | Pb mg/L | Final pH | Cd mg/L | Pb mg/L |
| EP Toxicity Test Standards | | 1.0 | 5.0 | | | |
| Drinking Water Standards (MCLs) | | | | | 0.01 | 0.05 |

There are single compound additives that can be used to control leaching in both an EP Toxicity Test and a water leach test, that are not covered by this invention disclosure, for example, reactive calcium carbonate and reactive magnesium carbonate as disclosed in U.S. Pat. No. 4,889,640, which is incorporated herein by reference. However, a problem with reactive calcium carbonate is that it is less effective at preventing the leaching of lead and cadmium, if the solid waste contains high levels of zinc, because zinc interferes with the conversion of lead and cadmium to carbonate salts.

SUMMARY OF THE INVENTION

In accordance with the present invention, a method is disclosed for treating solid hazardous waste containing unacceptable levels of leachable metals such as lead, cadmium and zinc, which includes the steps of mixing the solid waste with at least two additives, the first a pH buffering agent and an additional agent which is an acid or salt containing an anion that forms insoluble or non-leachable forms of leachable metals such as lead, cadmium and zinc. The pH buffering agent is selected from the group consisting of magnesium oxide, magnesium hydroxide, reactive magnesium carbonate and reactive calcium carbonate. The anion contributing agent is selected from the group consisting of phosphoric acid, ammonium phosphate, diammonium phosphate, boric acid, triple superphosphate (TSP), other inexpensive phosphate sources, and metallic iron. The solid waste and agents are mixed so that under both acidic and nonacidic leaching conditions, the metals will be converted to substantially non-leachable forms.

Preferably, the solid waste and agents are mixed into a mixture with a sufficient quantity of the agents so that any 100 gram sample of the mixture has sufficient quantities of the agents to limit cadmium extraction to below 1.0 mg/L and lead extraction to below 5.0 mg/L when the sample is analyzed in accordance with the EP Toxicity or TCLP Test, and at the same time, limit leaching of lead to below 0.05 mg/L and cadmium to below 0.01 mg/L when analyzed with a water leach test. This method would also be expected to control zinc leaching under both acid and nonacidic conditions, because like lead, zinc is an amphoteric metal.

Thus, a primary objective of the invention is to provide a method of treating solid hazardous wastes containing unacceptable levels of leachable metals such as lead, cadmium and zinc to reduce the leaching of lead, cadmium, and zinc and thereby render the waste non-EP toxic, while at the same time reducing lead and zinc leaching under the more typical nonacidic leaching conditions present in the environment.

A second objective of the invention is to make the treatment method disclosed in U.S. Pat. No. 4,889,640 more effective, by overcoming the problem of zinc interfering with lead and cadmium reaction in wastes which also contain zinc. This is accomplished by combining the reactive calcium carbonate or reactive magnesium carbonate with an anion contributing agent.

A third objective of the invention is to provide a method of treating solid hazardous waste containing unacceptable levels of leachable metals, such as lead, cadmium and zinc, so that the treatment effectiveness does not decrease with the age of the treated waste.

A fourth objective of the present invention is to provide a method for avoiding the generation of hazardous waste in foundries by introducing the chemical agents into the waste stream before the baghouse collector, or other covection device.

Other objects, features and advantages of the invention will be apparent from the following detailed description in which a preferred embodiment of the invention has been selected for exemplification.

DESCRIPTION OF THE PREFERRED EMBODIMENT

The present invention is a method of treating solid hazardous wastes to control leaching of lead, cadmium and zinc under both acidic and nonacidic leaching conditions. The process consists of mixing the solid waste with two agents, one a pH buffer and the other an acid or salt containing an anion that forms insoluble or non-leachable forms of the metals. The pH buffering agent is selected from the group consisting of magnesium oxide, magnesium hydroxide, reactive magnesium carbonate and reactive calcium carbonate.

The term "reactive" as used herein means a form of carbonate compound which will both neutralize the acetic acid in the EP Toxicity Test, and under test conditions and environmental conditions that support reaction between the agents and metals will react with the lead, cadmium and zinc in the solid waste. This reaction reduces the leachability of the metals by converting them into substantially non-leachable forms, most likely carbonate salts. Conditions which support reaction between the carbonate compound and metals include the presence of water or acetic acid. Other solvents may also support such reaction.

The term "substantially non-leachable forms" as used herein means for a form of lead which will not leach at above 5 mg/L or a form of cadmium which will not leach at above 1 mg/L when the mixture of waste and agents is analyzed using the EP Toxicity Test.

The term "EP Toxicity Test" as used herein includes the Extraction Procedure Toxicity Test, Toxicity Characteristic Leaching Procedure (TCLP) and other acidic leach tests.

The term "water leach test" as used herein includes the EP Water Test, U.S. EPA Multiple Extraction Procedure, American Society of Testing Materials Test, American Foundrymen's Society Leach Test, the University of Wisconson SLT Test, and other nonacidic water leach tests.

Sources of reactive calcium and/or magnesium carbonate include (1) water softening plant sludge (lime sludge) which usually includes a mixture of calcium carbonate, magnesium carbonate and calcium magnesium carbonate; (2) calcium carbonate which is formed in a solution and precipitated out; and (3) some industrial sludges containing calcium carbonate produced by water treatment processes, e.g. some paper mill lime sludges.

The anion contributing agent is selected from the group consisting of phosphoric acid, ammonium phosphate, diammonium phosphate, boric acid, triple superphosphate (TSP), other inexpensive phosphate sources, and metallic iron.

In the preferred embodiment, solid waste which is classified as hazardous due to high levels of leachable lead or cadmium is treated with a combination of magnesium oxide as a pH buffer and triple superphosphate (TSP) as an anion contributor. An appropriate mixture of these agents and the solid waste will control leaching of the metals under both acidic and nonacidic conditions.

By way of example, the treatment of wastes with TSP alone, magnesium oxide alone, and a combination of TSP and magnesium oxide is shown in Table 2. Treatment of the waste with TSP alone was not successful in limiting cadmium leaching to below the hazardous waste standard of 1.0 mg/L when analyzed using the EP Toxicity Test. Likewise, treatment of the waste with magnesium oxide alone limited leaching of cadmium and lead from the waste when analyzed using the EP Toxicity Test; however, the treated waste still leached levels of lead above the drinking water standard of 0.05 mg/L when analyzed using a water leach test. Treating the waste with a combination of magnesium oxide and TSP resulted in a treated waste that had low leaching potential when analyzed with both the EP Toxicity Test and a water leach test. As shown in Table 2, with the combined treatment, the concentration of lead and cadmium leached from the waste were below the U.S. EPA proposed treatment standards of 0.51 mg/L for lead and 0.14 mg/L for cadmium when analyzed using the EP Toxicity Test, and concentration of both metals were below the drinking water standards, or maximum contaminant levels of 0.05 mg/L for lead and 0.01 mg/L for cadmium when analyzed with a water leach test. The other buffering agents and anion contributing agents listed above could be utilized and would be expected to react with the lead, cadmium and zinc to form salts which would be substantially insoluble under both acidic and nonacidic leaching conditions. Metallic iron could also be used as the anion contributor. However, it is likely that metallic iron would reduce lead and cadmium leaching through chemical reduction, rather than by the formation of insoluble salts.

It should be noted that it would be expected that treatment of waste containing zinc with the method of the present invention would control the leaching of zinc under both acidic and nonacidic reaction conditions.

TABLE 2

TREATMENT OF EP TOXIC WASTES WITH MAGNESIUM OXIDE AND TRIPLE SUPERPHOSPHATE: EP TOXICITY AND WATER LEACH TEST RESULTS

| | EP Toxicity Test | | | EP (or ASTM) Water Test | | |
|---|---|---|---|---|---|---|
| | Final pH | Cd mg/L | Pb mg/L | Final pH | Cd mg/L | Pb mg/L |
| Sample 1 | | | | | | |
| Untreated | 4.9 | 13 | 140 | 7.1 | 7.1 | 3.5 |
| +7.5% MgO | 9.6 | 0.12 | 0.6 | 10.4 | <0.005 | 1.1 |
| Sample 2 | | | | | | |
| Untreated | 5.0 | 7.0 | 100 | 8.7 | 0.031 | 0.10 |
| +5% TSP | 5.0 | 7.0 | 16 | | | |
| +10% TSP | 5.0 | 4.7 | 1.1 | | | |
| +15% TSP | 5.0 | 2.5 | 0.4 | | | |
| +20% TSP | 5.1 | 1.1 | <0.1 | | | |
| +5% MgO | 6.1 | 6.3 | 6.4 | | | |

TABLE 2-continued
TREATMENT OF EP TOXIC WASTES WITH
MAGNESIUM OXIDE AND TRIPLE SUPERPHOSPHATE:
EP TOXICITY AND WATER LEACH TEST RESULTS

|  | EP Toxicity Test | | | EP (or ASTM) Water Test | | |
|---|---|---|---|---|---|---|
|  | Final pH | Cd mg/L | Pb mg/L | Final pH | Cd mg/L | Pb mg/L |
| +10% MgO | 7.4 | 3.5 | 3.2 | | | |
| +15% MgO | 9.2 | 0.044 | 0.2 | 10.3 | <0.005 | 0.075 |
| +20% MgO | 9.3 | 0.033 | 0.3 | | | |
| +5% TSP & 20% MgO | 7.7 | 0.24 | 0.1 | | | |
| +5% TSP & 25% MgO | 8.5 | 0.053 | <0.1 | 10.3 | <0.005 | 0.014 |
| Sample 3 | | | | | | |
| Untreated | 5.3 | 0.59 | 260 | 8.6 | <0.005 | .033 |
| +5% MgO | | Not Tested | | 10.7 | <0.005 | 0.250 |
| +5% MgO & 5% TSP | 9.2 | <0.005 | <0.1 | 10.4 | <0.005 | <0.003 |
| Standards | | 1.0 | 5.0 | | 0.01 | 0.05 |

In practicing the invention, the mixing of the solid waste with the pH buffering agent and anion contributing agent must be sufficiently complete so that a random small sample (e.g. 100 grams) of the waste mixture will have sufficient agents to limit cadmium extraction to below 1.0 mg/L and lead extraction to below 5.0 mg/L when the waste mixture is analyzed using the Extraction Procedure Toxicity Test, and to limit cadmium leaching to below 0.01 mg/L and lead leaching to below 0.05 mg/L when the waste mixture is analyzed using a water leach test. For a specific solid waste, the appropriate ratio of agents to solid waste may be arrived at by experimentation on 100 gram samples of the waste having various percentages of the agents by weight. The appropriate ratios of agents to waste would be ratios which result in the leaching of lead and cadmium at levels significantly below the hazardous waste standards when analyzed using the EP Toxicity Test and leaching of lead and cadmium at levels significantly below the drinking water standards when analyzed using a water leach test. The appropriate ratios will vary with the concentration of leachable heavy metals in the waste.

Dry mixing of the agents with the solid waste does not necessarily cause the reactions which convert the lead, cadmium and zinc into substantially non-leachable forms. This reaction may not occur until the waste mixture is analyzed using the Extraction Procedure Toxicity Test and will result in the material not being classified as EP toxic. The reactions may also not occur until the waste mixture is analyzed using a water leach test, which is designed to simulate the leaching conditions present in an industrial landfill. In the field, the reaction will probably occur slowly as the waste is wetted.

The pH buffering agent and anion contributing agent may be mixed with the solid waste in a foundry either before or after the dust is collected form the waste gas stream. Both points of addition have been used in the past for addition of materials to foundry wastes. For example, injection of materials, commonly lime, into foundry ductwork has been used for years as a method of coating baghouses with materials to protect against sparks and improve dust collecting. Such mixing may be accomplished by injection of the pH buffering agent and anion contributing agent into foundry ductwork before the baghouse. This is a preferred application, because treatment int he ductwork prior to dust collection may eliminate the generation of a hazardous waste because such treatment is considered totally enclosed treatment by the U.S. EPA and does not require permitting. Because generators of hazardous waste are subject to regulation, it is an advantage to avoid generating hazardous waste in the first place.

The two agents used in the preferred embodiment of the invention, magnesium oxide and triple superphosphate, are both dry materials that can be injected into ductwork. Triple superphosphate, however, would need to be pulverized before being injected.

It is understood that the invention is not confined to the particular process disclosed herein, nor to the materials and substances described, but embraces such modified forms thereof as come within the scope of the following claims.

What is claimed is:

1. A method of treating solid hazardous waste containing unacceptable levels of leachable metals selected from the group consisting of lead and cadmium, the method comprising the steps of mixing the solid waste with at least one first agent selected from the group consisting of magnesium oxide and magnesium hydroxide, and an additional agent which is triple superphosphate, so that under both acidic and nonacidic leaching conditions, the metals in the mixture will be converted to substantially non-leachable forms.

2. The method of claim 1 wherein the solid waste and agents are mixed into a mixture with sufficient quantities of each of the agents so that a random 100 gram sample of the mixture will have sufficient agents to limit cadmium extraction to below 1.0 mg/L and lead extraction to below 5.0 mg/L when analyzed by the Extraction Procedure Toxicity Test, and cadmium leaching to below 0.01 mg/L and lead leaching to below 0.05 mg/L when analyzed with a water leach test.

3. A non-hazardous solid waste mixture which may be safely disposed of in a landfill, comprising a solid hazardous waste containing unacceptable levels of leachable metals selected from the group consisting of lead and cadmium, mixed with at least one fist agent selected from the group consisting of magnesium oxide and magnesium hydroxide, and an additional agent which is triple superphosphate, in quantities sufficient so that under both acidic and nonacidic leaching conditions, the metals will be converted to substantially non-leachable forms.

4. The non-hazardous solid waste mixture of claim 3 wherein there is a sufficient quantity of each of the agents incorporated into the mixture so that when a random 100 gram sample of the mixture is analyzed by the Extraction Procedure Toxicity Test, cadmium is extracted at a level below 1.0 mg/L and lead is extracted at a level below 5.0 mg/L, and when a random 100 gram sample of the mixture is analyzed using a water leach test, cadmium will leach at a level below 0.01 mg/L and lead will leach at a level below 0.05 mg/L.

5. A method of treating solid hazardous waste containing unacceptable levels of leachable metals selected from the group consisting of lead and cadmium, the method comprising the steps of mixing the solid waste with at least one first agent selected from the group consisting of magnesium oxide, magnesium hydroxide, reactive calcium carbonates and reactive magnesium carbonates, and at least one additional agent selected from the group consisting of triple superphosphate, ammonium phosphate, diammonium phosphate, phosphoric acid, boric acid and metallic iron so that under both acidic and nonacidic leaching conditions, the metals in the mixture will be converted to substantially non-leachable forms.

6. The method of claim 5 wherein the solid waste and agents are mixed into a mixture with sufficient quantities of each of the agents so that a random 100 gram sample of the mixture will have sufficient agents to limit cadmium extraction to below 1.0 mg/L and lead extraction to below 5.0 mg/L when analyzed by the Extraction Procedure Toxicity Test, and cadmium leaching to below 0.01 mg/L and lead leaching to below 0.05 mg/L when analyzed with a water leach test.

7. A non-hazardous solid waste mixture which may be safely disposed of in a landfill, comprising a solid hazardous waste containing unacceptable levels of leachable metals selected form the group consisting of lead and cadmium, mixed with at least one first agent selected from the group consisting of magnesium oxide, magnesium hydroxide, reactive calcium carbonates and reactive magnesium carbonates, and at least one additional agent selected from the group consisting of triple superphosphate, ammonium phosphate, diammonium phosphate, phosphoric acid, boric acid, and metallic iron in quantities sufficient so that under both acidic and nonacidic leaching conditions, the metals will be converted to substantially nonleachable forms.

8. The non-hazardous solid waste mixture specified in claim 7 wherein there is a sufficient quantity of each of the agents incorporated into the mixture so that when a random 100 gram sample of the mixture is analyzed by the Extraction Procedure Toxicity Test, cadmium is extracted at a level below 1.0 mg/L and lead is extracted at a level below 5.0 mg/L, and when a random 100 gram sample of the mixture is analyzed using a water leach test, cadmium will leach at a level below 0.01 mg/L and lead will leach at a level below 0.05 mg/L.

9. A method of treating solid hazardous waste containing unacceptable levels of leachable metals selected from the group consisting of lead and cadmium, the method comprising the steps of mixing the solid waste with at least one first agent selected from the group consisting of magnesium oxide, magnesium hydroxide, reactive calcium carbonates and reactive magnesium carbonates, and at least one additional agent selected from the group consisting of triple superphosphate, ammonium phosphate, diammonium phosphate, phosphoric acid and boric acid so that under both acidic and nonacidic leaching conditions, the metals in the mixture will be converted to substantially non-leachable forms.

10. The method of claim 9 wherein the solid waste and agents are mixed into a mixture with sufficient quantities of each of the agents so that a random 100 gram sample of the mixture will have sufficient agents to limit cadmium extraction to below 1.0 mg/L and lead extraction to below 5.0 mg/L when analyzed by the Extraction Procedure Toxicity Test, and cadmium leaching to below 0.01 mg/L and lead leaching to below 0.05 mg/L when analyzed with a water leach test.

11. A non-hazardous solid waste mixture which may be safely disposed of in a landfill, comprising a solid hazardous waste containing unacceptable levels of leachable metals selected from the group consisting of lead and cadmium, mixed with at leas tone first agent selected from the group consisting of magnesium oxide, magnesium hydroxide, reactive calcium carbonates and reactive magnesium carbonates, and at least one additional agent selected from the group consisting of triple superphosphate, ammonium phosphate, diammonium phosphate, phosphoric acid and boric acid in quantities sufficient so that under both acidic and nonacidic leaching conditions, the metals will be converted to substantially nonleachable forms.

12. The non-hazardous solid waste mixture of claim 11 wherein there is a sufficient quantity of each of the agents incorporated into the mixture so that when a random 100 gram sample of the mixture is analyzed utilizing the Extraction Procedure Toxicity Test, cadmium is extracted at a level below 1.0 mg/L and lead is extracted at a level below 5.0 mg/L, and when a random 100 gram sample of the mixture is analyzed using a water leach test, cadmium will leach at a level below 0.01 mg/L and lead will leach at a level below 0.05 mg/L.

13. A method of treating solid hazardous waste containing unacceptable levels of leachable metals selected from the group consisting of lead and cadmium, the method comprising the steps of mixing the solid waste with at least one buffering agent, and further mixing it with at least one additional agent selected from the group consisting of triple superphosphate, ammonium phosphate, diammonium phosphate, phosphoric acid, boric acid and metallic iron so that under both acidic and nonacidic leaching conditions the metals in the mixture will be converted to substantially nonleachable forms.

14. A nonhazardous solid waste mixture which may be safely disposed of in a landfill, comprising a solid hazardous waste containing unacceptable levels of leachable metals selected from the group consisting of lead and cadmium, mixed with at least one buffering agent and further mixed with at leas tone additional agent selected from the group consisting of triple superphosphate, ammonium phosphate, diammonium phosphate, phosphoric acid, boric acid, and metallic iron in quantities sufficient so hat under both acidic and nonacidic leaching conditions, the metals will be converted to substantially nonleachable forms.

15. A method of treating solid hazardous waste containing unacceptable levels of leachable metals selected from the group consisting of lead, cadmium and zinc, the method comprising the steps of mixing the solid waste with at least one first agent selected from the group consisting of magnesium oxide, magnesium hydroxide, reactive calcium carbonates and reactive magnesium carbonates, and at least one additional agent selected from the group consisting of triple superphosphate, ammonium phosphate, diammonium phosphate, phosphoric acid, boric acid and metallic iron so that under both acidic and nonacidic leaching conditions, the metals in the mixture will be converted to substantially non-leachable forms.

16. The method of claim 15 wherein the solid waste and agents are mixed into a mixture with sufficient quantities of each of the agents so that a random 100 gram sample of the mixture will have sufficient agents to limit cadmium extraction to below 1.0 mg/L and lead extraction to below 5.0 mg/L when analyzed by the Extraction Procedure Toxicity Test, and cadmium leaching to below 0.01 mg/L and lead leaching to below 0.05 mg/L when analyzed with a water leach test.

17. A non-hazardous solid waste mixture which may be safely disposed of in a landfill, comprising a solid hazardous waste containing unacceptable levels of leachable metals selected from the group consisting of lead, cadmium and zinc, mixed with at leas tone first agent selected from the group consisting of magnesium oxide, magnesium hydroxide, reactive calcium carbonates and reactive magnesium carbonates, and at least one additional agent selected from the group consisting of triple superphosphate, ammonium phosphate, diammonium phosphate, phosphoric acid, boric acid, and metallic iron in quantities sufficient so that under both acidic and nonacidic leaching conditions, the metals will be converted to substantially nonleachable forms.

18. The non-hazardous solid waste mixture of claim 17 wherein there is a sufficient quantity of each of the agents incorporated into the mixture so that when a random 100 gram sample of the mixture is analyzed by the Extraction Procedure Toxicity Test, cadmium is extracted at a level below 1.0 mg/L and lead is extracted at a level below 5.0 mg/L, and when a random 100 gram sample of the mixture is analyzed using a water leach test, cadmium will leach at a level below 0.01 mg/L and lead will leach at a level below 0.05 mg/L.

* * * * *